US008862859B2

(12) United States Patent
Dooley et al.

(10) Patent No.: US 8,862,859 B2
(45) Date of Patent: Oct. 14, 2014

(54) EFFICIENT SUPPORT OF MULTIPLE PAGE SIZE SEGMENTS

(75) Inventors: Miles R. Dooley, Austin, TX (US); Sundeep Chadha, Austin, TX (US); Naresh Nayar, Rochester, MN (US); Randal C. Swanberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 12/775,652

(22) Filed: May 7, 2010

(65) Prior Publication Data

US 2011/0276778 A1    Nov. 10, 2011

(51) Int. Cl.
*G06F 12/10*    (2006.01)

(52) U.S. Cl.
CPC .................................. *G06F 12/1027* (2013.01)
USPC ....................................................... 711/207

(58) Field of Classification Search
None
See application file for complete search history.

(56) References Cited

U.S. PATENT DOCUMENTS

| | | | | |
|---|---|---|---|---|
| 5,058,003 | A | * | 10/1991 | White ............................ 711/209 |
| 5,375,214 | A | * | 12/1994 | Mirza et al. .................... 711/207 |
| 5,446,854 | A | * | 8/1995 | Khalidi et al. ..................... 711/1 |
| 5,465,337 | A | | 11/1995 | Kong |
| 5,895,501 | A | | 4/1999 | Smith |
| 6,182,089 | B1 | | 1/2001 | Ganapathy et al. |
| 6,216,214 | B1 | * | 4/2001 | Bryg et al. .................... 711/207 |
| 6,393,544 | B1 | * | 5/2002 | Bryg et al. .................... 711/220 |
| 6,549,997 | B2 | | 4/2003 | Kalyanasundharam |
| 6,625,715 | B1 | | 9/2003 | Mathews |
| 7,089,398 | B2 | | 8/2006 | Zhang |
| 7,100,018 | B2 | | 8/2006 | Zhang et al. |
| 7,117,339 | B2 | | 10/2006 | Gurumoorthy et al. |
| 7,159,095 | B2 | | 1/2007 | Dale et al. |
| 7,284,112 | B2 | * | 10/2007 | Bradford et al. .............. 711/206 |
| 7,370,174 | B2 | | 5/2008 | Arizpe et al. |
| 7,487,329 | B2 | | 2/2009 | Hepkin et al. |
| 7,590,820 | B2 | | 9/2009 | Dong et al. |
| 7,607,048 | B2 | | 10/2009 | Echeruo et al. |
| 7,917,725 | B2 | | 3/2011 | Stecher |
| 7,940,277 | B2 | | 5/2011 | Hansen et al. |

(Continued)

OTHER PUBLICATIONS

Michel Cekleov and Michel Dubois. 1997. Virtual-Address Caches Part 1: Problems and Solutions in Uniprocessors. IEEE Micro 17, 5 (Sep. 1997), 64-71.*

(Continued)

*Primary Examiner* — Matthew Bradley
*Assistant Examiner* — Ramon A Mercado
(74) *Attorney, Agent, or Firm* — Van Leeuwen & Van Leeuwen; John D. Flynn

(57) ABSTRACT

An apparatus, system, and method are disclosed for improved support of MPS segments in a microprocessor. The virtual address is used to generate possible TLB index values for each of the supported page sizes of the MPS segment associated with the virtual address. The possible TLB index values may be a hash generated using the virtual address and one of the supported page sizes. The TLB is searched for actual TLB index values that match the possible TLB index values calculated using the different supported page sizes. TLB entries associated with those actual TLB index values are checked to determine whether any TLB entry is associated with the virtual address. If no match is found, the real address is retrieved from the PT. The actual page size in the PT is used to generate an actual TLB index value for the virtual address and the TLB entry is inserted into the TLB.

18 Claims, 8 Drawing Sheets

(56) References Cited

U.S. PATENT DOCUMENTS

| | | | |
|---|---|---|---|
| 2002/0133685 A1* | 9/2002 | Kalyanasundharam | 711/207 |
| 2004/0221128 A1* | 11/2004 | Beecroft et al. | 711/203 |
| 2006/0004795 A1 | 1/2006 | Shah et al. | |
| 2006/0161758 A1* | 7/2006 | Bradford et al. | 711/202 |

OTHER PUBLICATIONS

Notice of Allowance for U.S. Appl. No. 12/779,563 (Chadha et al., "Multiple Page Size Segment Encoding," filed May 13, 2010), U.S. Patent and Trademark Office, mailed Jun. 12, 2013, 10 pages.

Good et al., "Segment Space Support"; IP.com/IBM TDB; Mar. 1, 1990, 4 pages.

Schneider et al., "Scalable Locality-Conscious Multithreaded Memory Allocation"; ACM Digital Library; pp. 84-95; International Symposium on Mathematical Morphology, Ottowa, Ontario, Canada, Jun. 2006.

Panda et al., "Data and Memory Optimization Techniques for Embedded Systems"; ACM Digital Library; ACM Transactions on Design Automation of Electronic Systems, pp. 149-206; vol. 6, No. 2; Apr. 2001.

Middha et al. "MTSS: Multitask Stack Sharing for Embedded Systems"; ACM Digital Library; ACM Transactions on Embedded Computing Systems, vol. 7, No. 4, Article 46, Jul. 2008, 37 pages.

Office Action for U.S. Appl. No. 12/779,563 (Chadha et al., "Multiple Page Size Segment Encoding," filed May 13, 2010), U.S. Patent and Trademark Office, mailed Mar. 12, 2013, 12 pages.

Power ISA Version 2.06, Softcopy Distrubution: http://www.power.org/resources/reading/, Jan. 30, 2009, pp. 770-790.

* cited by examiner

VA=0x1234567  4K VPN=0x1234  64K VPN=0x123

Possible TLB index value 1 = HASH_FUNCTION_4K(VA) = 9

Possible TLB index value 2 = HASH_FUNCTION_64K(VA) = 125

Actual TLB index values

| | | | |
|---|---|---|---|
| 5 | | | |
| 6 | | | |
| 7 | | | |
| 8 | | | |
| 9 | VPN=0x7770 PS=4K | VPN=0x922 PS=64K | VPN=0x577 PS=64K | VPN=0x9870 PS=4K |
| 10 | | | | |

| | | | |
|---|---|---|---|
| 123 | | | | |
| 124 | | | | |
| 125 | VPN=0x2588 PS=4K | VPN=0x6453 PS=4K | VPN=0x123 PS=64K | VPN=0x222 PS=64K |
| 126 | | | | |
| 127 | | | | |
| 128 | | | | |

FIG. 8

EFFICIENT SUPPORT OF MULTIPLE PAGE SIZE SEGMENTS

FIELD

The subject matter disclosed herein relates to supporting multiple page size (MPS) segments in a processor, such as IBM's Power series microprocessors.

BACKGROUND

Description of the Related Art

Microprocessors use a variety of data structures to improve their performance. For example, caches are commonly used to reduce the time needed to retrieve information for the microprocessor. Microprocessors often need to translate an effective address to a real address in order to execute instructions or perform other necessary operations. Certain microprocessors use a variety of data structures to facilitate this translation.

For example, IBM's Power series of microprocessors translate an effective address to a real address. The effective address is translated into a virtual address, which virtual address is in turn translated into a real address. Microprocessors may use a data structure commonly referred to as a translation lookaside buffer ("TLB") to facilitate translating the virtual address into a real address.

For microprocessors that support segments with varying page sizes, space in the TLB may not be used as effectively as possible. For example, if indexing is based on a 4 KB base page size, for a 64 KB actual page, there may be sixteen entries in the TLB pointing to the same page. As a result, the microprocessor may not be using the TLB in the most efficient manner possible.

BRIEF SUMMARY

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

In one embodiment, the invention is a method for improved support of multiple page size ("MPS") segments in a microprocessor. The method may include receiving a virtual address that is associated with a page of an MPS segment. An MPS segment includes one or more pages and supports a number of different actual page sizes. The method may also include generating a plurality of possible TLB index values using the supported actual page sizes for the MPS segment.

The virtual address may also be used to generate the possible TLB index values. For example, the virtual page number ("VPN") portion of the virtual address may be used along with the supported actual page sizes to generate the possible TLB index values.

The method may also include finding one or more actual TLB index values that match the possible TLB index values. For the TLB entries associated with the matching actual TLB index values, the method may include determining whether any of these TLB entries is associated with the virtual address. If a TLB entry associated with the virtual address is found, the real address is retrieved from the TLB entry.

If no TLB entry is found, the method may include retrieving the real address from a page table entry ("PTE") in a page table ("PT") associates with the virtual address. The method may also include retrieving, from the PTE, the actual page size of the page that is associated with the virtual address, determining the actual TLB index value for the virtual address using the actual page size, and inserting a TLB entry for the virtual address in the TLB in the position associated with the actual TLB index value.

The method may also include generating an effective to real address translation ("ERAT") index value using the actual page size, and inserting an ERAT entry into the ERAT lookaside buffer at the position associated with the ERAT index value.

Generating the possible TLB index values may include generating one possible TLB index value for each supported actual page size. The possible TLB index values may be hash values generated using the virtual address and one of the supported actual page sizes.

Determining whether any TLB entry is associated with the virtual address may include comparing the actual page size stored in the TLB entry with the supported page size that was used to generate the possible TLB index value, and comparing the virtual address stored in the TLB entry with the virtual address used to generate the possible TLB index value. In certain embodiments, the method determines that the TLB entry is associated with the virtual address if these values (page size and virtual address) match.

The invention may also be embodied as an apparatus for improved support of MPS segments in a microprocessor. The apparatus may include a virtual address module for receiving a virtual address that is associated with a page of an MPS segment, and a generation module for generating a plurality of possible TLB index values using the supported actual page sizes for the MPS segment. The apparatus may further include a matching module that finds the actual TLB index values that match the possible TLB index values, and determines whether any TLB entry that is associated with the matching actual TLB index values is associated with the virtual address. The apparatus may also include a retrieval module for retrieving the real address from the TLB entry that is associated with the virtual address.

The invention may also be embodied as a system for improved support of MPS segments in a microprocessor. The system may include a microprocessor for executing instructions, and a MMU for handling accesses to memory requested by the microprocessor. The MMU may be configured to receive an effective address and to translate the effective address into a virtual address using a segment lookaside buffer ("SLB"), and to receive the virtual address associated with a page of the MPS segment. The MMU may further be configured to generate a plurality of possible TLB index values using the supported actual page sizes for the MPS segment, and to find one or more actual TLB index values that match the possible TLB index values. The MMU may then determine whether any TLB entry associated with the actual index values that match the possible TLB index values are associated with the virtual address, and if so, retrieve the real address from that TLB entry.

The system may also include other computer components such as, for example, a motherboard, a laptop computer, a desktop computer, a server, or other computing device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a schematic block diagram illustrating one embodiment of a TLB with improved support for MPS segments.

DETAILED DESCRIPTION

Figure 1:
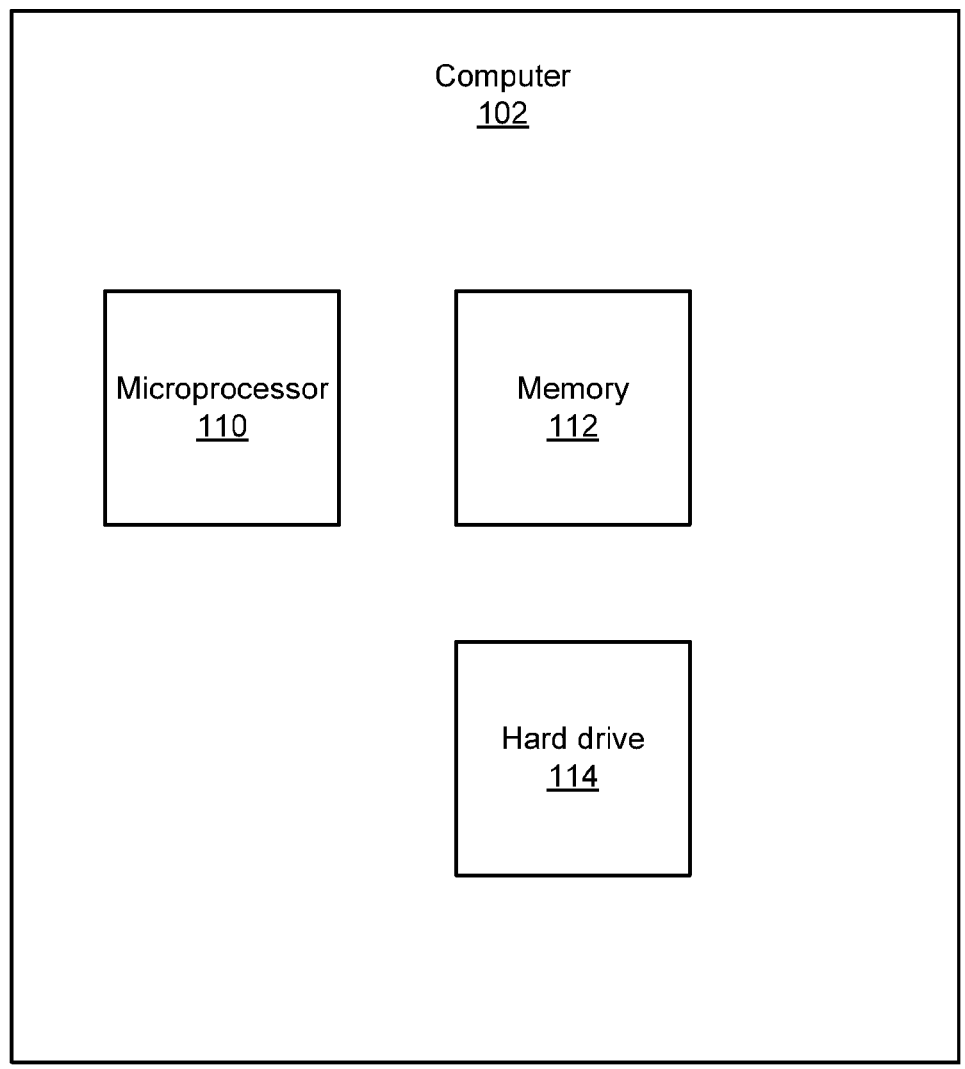
FIG. 1 is a schematic block diagram illustrating one embodiment of a system that may benefit from improved support of MPS segments in a microprocessor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable program code embodied on a computer readable medium may be transmitted using any appropriate medium, including but not limited to wireless, wireline, optical fiber cable, RF, etc., or any suitable combination of the foregoing.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments of the invention may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts a system 100 which may benefit from improved supported of multiple page size ("MPS") segments in a microprocessor. FIG. 1 shows a computer 102 which includes a microprocessor 110, a memory 112, and a hard drive 114. Those of skill in the art will appreciate that a computer 102 may include many components in addition to those shown in FIG. 1. For example, the computer 102 may include input devices such as a keyboard, output devices such as a monitor, and many other components such as optical drives, universal serial bus ("USB") ports, etc. The computer 102 may be a laptop computer, a desktop computer, a server, a netbook, or other variety of computing device.

The microprocessor 110 is the portion of the computer 102 that executes instructions and processes data. In order to perform its functions, the microprocessor 110 requires access to memory (such as memory 112). The memory 112 stores information (such as data and instructions) for the microprocessor 110. The computer 102 may include a motherboard to facilitate communications between the various components of the computer 102. The computer 102 may also include additional storage provided by a secondary storage device such as a hard drive 114. In accordance with the present invention, the microprocessor 110 uses improved support of MPS segments, as described in greater detail below.

Figure 2:
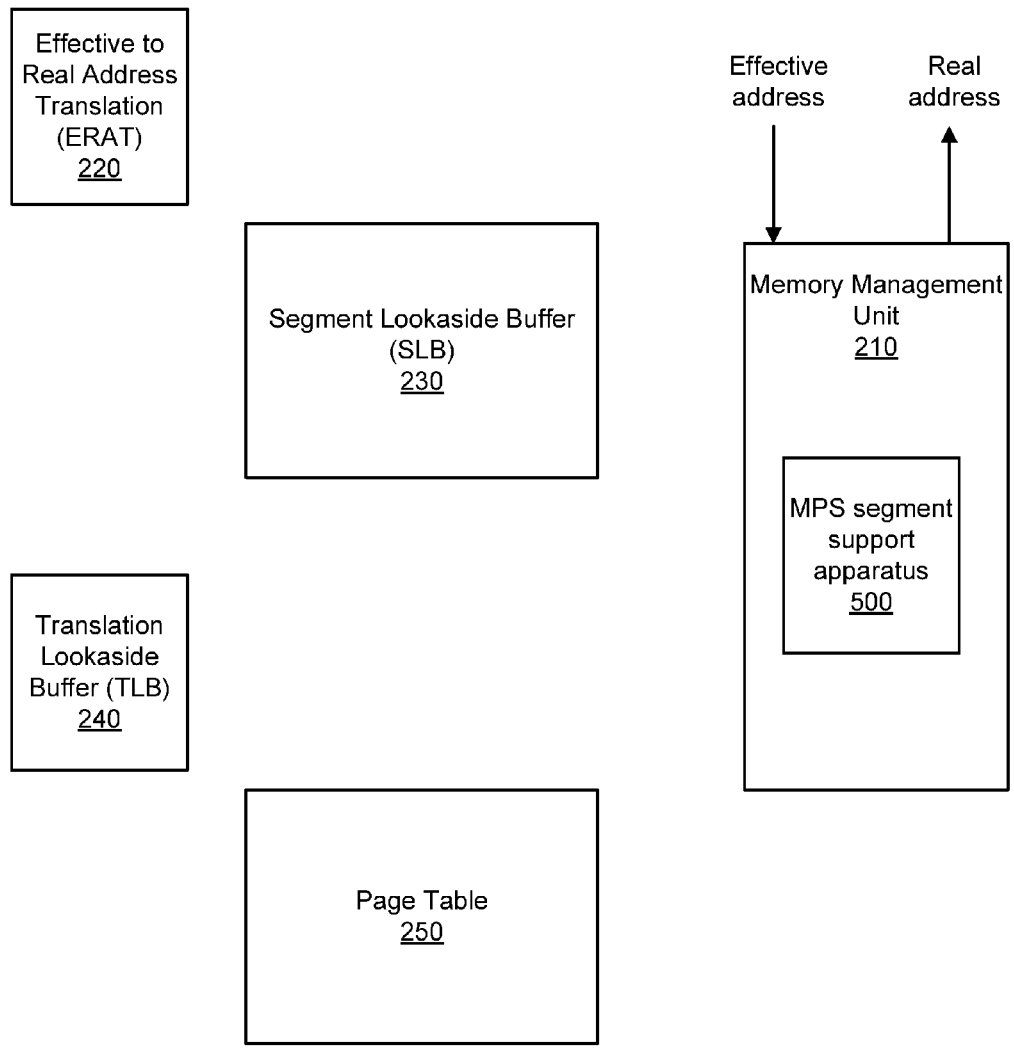
FIG. 2 is a schematic block diagram illustrating one embodiment of an MMU and data structures that may be used for improved support of MPS segments in a microprocessor.

FIG. 2 shows one embodiment of a memory management unit ("MMU") 210 and various data structures which the MMU 210 utilizes. The MMU 210 is a component that is responsible for handling accesses to memory requested by the microprocessor 110. In one embodiment, the MMU 210 uses data structures such as the effective to real address translation ("ERAT") 220, the segment lookaside buffer ("SLB") 230, translation lookaside buffer ("TLB") 240, and page table ("PT") 250 to facilitate handling requests from the microprocessor 110. In certain embodiments, the MMU 210 receives an effective address and, using one or more of the data structures described above, retrieves a real address. The effective address is the address generated by the hardware in the microprocessor 110 for an instruction fetch or for a data access. The real address is the address of a byte in real storage or on an I/O device.

In one embodiment, the SLB 230 maps effective addresses to virtual addresses. In certain embodiments, the effective address space is a subset of the virtual address space. The SLB 230 may, for example, map the effective segment IDs ("ESIDs) to virtual segment IDs ("VSIDs"). The PT 250 contains page table entries ("PTEs"). The PT 250 is used to translate the virtual address to a real address. Thus, in certain embodiments, the MMU 210 receives an effective address, retrieves the associated virtual address from the SLB 230, and then retrieves the real address associated with the virtual address from the PT 250.

The ERAT 220 is a first level translation cache that maps effective addresses to real addresses. In certain embodiments, the ERAT 220 is fully associative and is a very small cache. For example, certain embodiments of the ERAT 220 may hold only 32 or 64 entries. The MMU 210 may check the ERAT first for an entry for the effective address. If the check results in a cache hit, the MMU 210 can retrieve the real address from the ERAT 220 without having to check the other data structures.

The TLB 240 is a second level translation cache that maps virtual addresses to real addresses. The TLB 240 may be much larger than the ERAT 220 (certain embodiments of the TLB 240 hold 512 or 1024 entries). The TLB 240, in certain embodiments, is "n" way set associative rather than fully associative. In one embodiment, the TLB 240 is 4-way set associative. Thus, in one embodiment, the TLB 240 is a 512-entry 4-way set associative TLB that can have 128 TLB index values, where each TLB index value is associated with 4 TLB entries. The TLB 240 may speed operations by allowing the MMU 210 to retrieve a real address associated with the virtual address from the TLB 240 without reading the PT 250.

In certain embodiments, the MMU 210 includes an MPS segment support apparatus 500 for improved support of MPS segments. In certain embodiments, the MPS segment support apparatus 500 provides improved indexing and searching in the TLB 240 to allow the MMU 210 to retrieve a real address without loading the PT 250. The MPS segment support apparatus (described in greater detail below) may be realized in hardware, firmware, software, or some combination of the three. In one embodiment, the MPS segment support apparatus puts PTEs in the TLB based on an actual page size hashed index rather than a base page size hashed index. Similarly, the MPS segment support apparatus 500, while looking up the TLB in order to translate a virtual address to a real address, may look up the TLB multiple times using different supported page sizes. In certain embodiments, the MPS segment support apparatus 500 may be implemented entirely within the MMU 210; in other embodiments, the MPS segment support apparatus 500 may be implemented in one or more components of the microprocessor 110.

Figure 3:
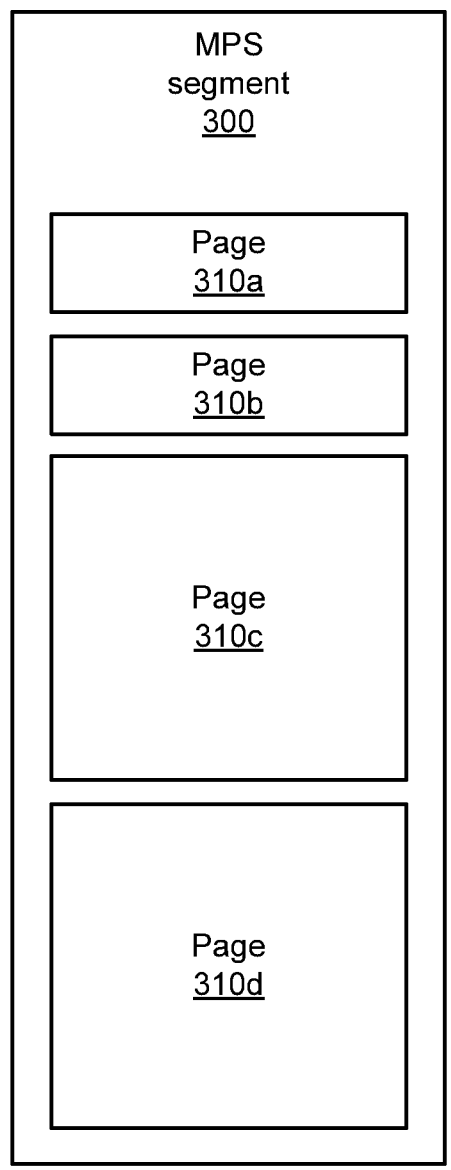
FIG. 3 is a schematic block diagram illustrating one embodiment of an MPS segment.

FIG. 3 shows one embodiment of an MPS segment 300. An MPS segment includes pages 310a-d. As described above, an MPS segment 300 can include pages 310a-b of different sizes. For example, in one embodiment, the MPS segment 300 may be a 256 MB segment with 4 KB or 16 MB pages. The MPS segment 300 may be a 1TB segment with 4 KB, 64 KB, 16 MB, and 16 GB pages. The page sizes that are supported by the MPS segment 300 are referred to herein as the supported actual page sizes. For example, 4 KB, 64 KB, 16 MB, and 16 GB may be supported actual page sizes for the 1 TB segment case. Other MPS segment 300 sizes with different supported sizes of pages 301a-d may also be possible.

In certain embodiments, the MPS segment 300 also has a base page size. The base page size is the smallest virtual page size for the segment. In certain embodiments, the other supported page sizes in the MPS segment 300 are multiples of the base page size for the MPS segment 300. Some (or all) of the pages 310a-d may, however, have an actual page size that differs from the base page size. For example, the MPS segment 300 may include a page 310c that has a base page size of 4 KB, but an actual page size of 64 KB. A single MPS segment 300 may include pages 310a-d of varying size as opposed to containing pages 210a-d that are all the same size. In one embodiment, the MPS segment support apparatus 500 efficiently indexes and searches for pages 310a-d in the TLB 240 using the actual page sizes of the pages 310a-d.

Figure 4:
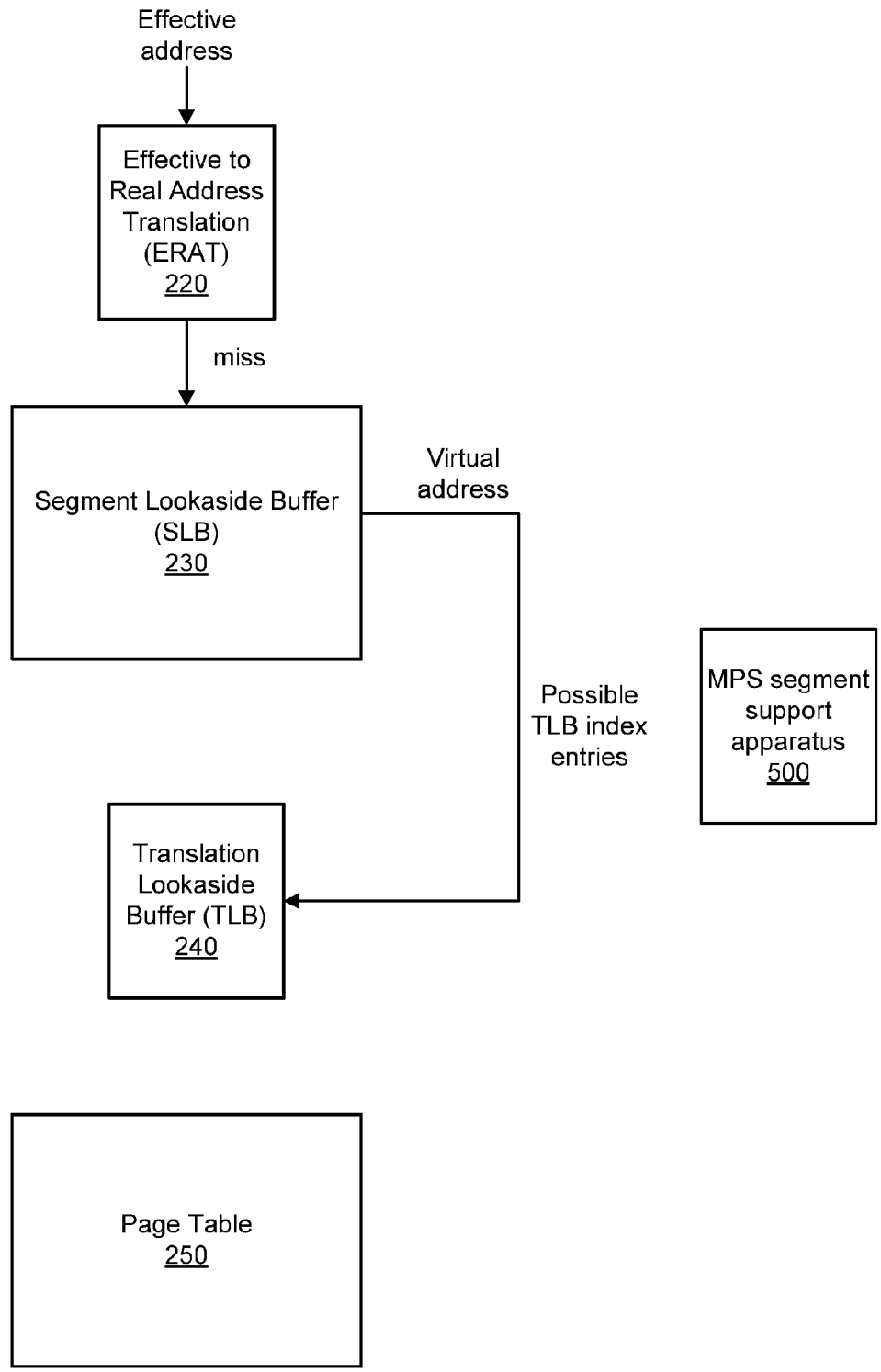
FIG. 4 is a schematic block diagram illustrating one embodiment of an MPS segment support apparatus utilizing data structures to implement improved support of MPS segments in a microprocessor.

FIG. 4 shows one embodiment of efficiently searching for a page 310 of an MPS segment 300 using the data structures described in FIG. 2. As noted above, the various steps and operations may be executed by the MMU 210 or other components of the microprocessor 110. In one embodiment, the microprocessor 110 requests data associated with a particular effective address. For example, the microprocessor 110 may be performing a LOAD operation. The ERAT 220 is checked for the effective address. If the ERAT 220 includes an entry for the effective address, the real address is returned and additional operations may not be necessary to retrieve the real address. If there is a miss (i.e., there is no entry for the effective address in the ERAT 220), the SLB 230 is used to retrieve a virtual address associated with the effective address.

In one embodiment, the MPS segment support apparatus 500 receives the virtual address. The MPS segment support apparatus 500 may then generate a number of possible TLB index values using the supported actual page sizes for the MPS segment and the virtual address. The possible TLB index values are numerical values which may be associated with one or more entries in the TLB 240 as shown in FIG. 8. For example, the possible TLB index values may be a 7-bit number to index one of 128 sets, each set associated with 4 TLB entries. The MPS segment support apparatus 500 may then find those actual TLB index values that match the possible TLB index values. For the TLB entries associated with these actual TLB index values, the MPS segment support apparatus 500 may then determine which (if any) TLB entry is associated with the virtual address. If there is a TLB entry associated with the virtual address, the appropriate TLB entry is selected and the real address is retrieved from the TLB entry. As a result, the PT 250 may not need to be read.

If the MPS segment support apparatus 500 determines that there is no TLB entry associated with the virtual address, the PT 250 may need to be read in order to retrieve the real address from a particular page table entry ("PTE") stored therein. When the PT 250 is loaded, the MPS segment support apparatus 500 may insert a TLB entry in the TLB 240 to aid in subsequent requests for the particular virtual address. The MPS segment support apparatus 500 may retrieve the actual page size of the page that is associated with the virtual address from the PTE in the PT 250, determine the actual TLB index value for the virtual address using the actual page size, and then inserting the TLB entry in the TLB 240 at the position associated with the actual TLB index value. On subsequent requests, searching for the TLB entry using the possible TLB index value generated using the supported actual page size may result in a "hit" since there will be an actual TLB index value generated using the actual page size.

Figure 5:
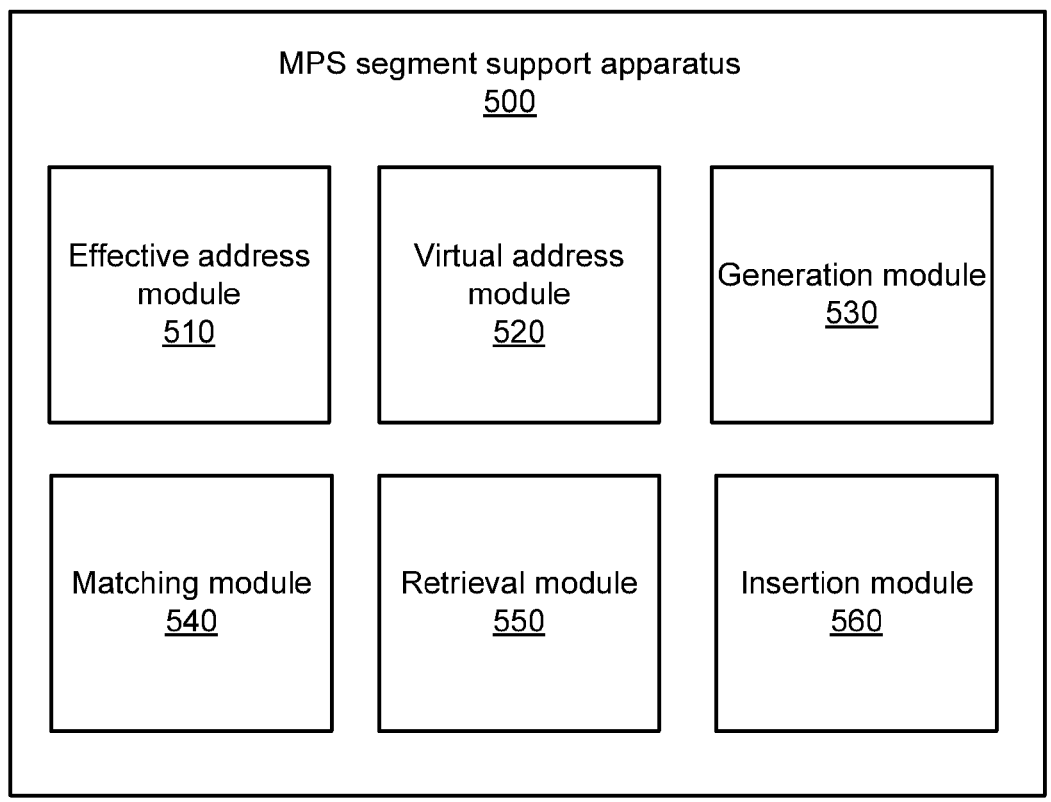
FIG. 5 is a schematic block diagram illustrating one embodiment of an MPS segment support apparatus for improved support of MPS segments in a microprocessor.

FIG. 5 shows one embodiment of an MPS segment support apparatus 500. In one embodiment, the MPS segment support apparatus 500 includes an effective address module 510, a virtual address module 520, a generation module 530, a matching module 540, a retrieval module 550, and an insertion module 560.

The effective address module 510 receives an effective address that is associated with the page of an MPS segment and translates the effective address into a virtual address using the SLB 230. The virtual address module 520 receives a virtual address that is associated with the page of the MPS segment. In certain embodiments, the virtual address module 520 receives the virtual address from the effective address module 510.

The generation module 530 generates a plurality of possible TLB index value using the supported actual page sizes for the MPS segment. The generation module 530 may generate one possible TLB index value for each actual page size supported by the MPS segment. In certain embodiments, the TLB index values are a hash value created using the virtual address and the page size associated with that virtual address. The generation module 530 may generate one possible TLB index value that is a hash using the virtual address and the 4 KB supported actual page size; one possible TLB index value that is a hash using the virtual address and the 64 KB supported actual page size; one possible TLB index value that is a hash using the virtual address and the 16 MB supported actual page size; and one possible TLB index value that is a hash using the virtual address and the 16 GB supported actual page size. In the above example, there would be four possible TLB index values generated by the generation module 530.

The matching module 540 finds one or more actual TLB index values that match the possible TLB index values. This yields a subset of the TLB entries which may be associated with the virtual address. The matching module 540 then determines whether any TLB entry in this subset is associated with the virtual address. In one embodiment, the matching module 540 executes a multiple searches for an appropriate TLB entry in parallel. In order to determine whether a TLB entry in the subset is associated with the virtual address, the matching module 540 may compare the actual page size and virtual address stored in the particular TLB entry with the supported page size and virtual address used to generate the possible TLB index value. If the values match, then the result is a cache hit in the TLB and the real address is retrieved from the TLB entry. If the values do not match, the result is a cache miss in the TLB.

For example, the matching module 540 may search the TLB index for actual TLB index values that match one of the four possible TLB index values that were generated using the four supported actual page sizes, which possible TLB index values are hashes. By finding the actual TLB index values that match the possible TLB index values, the matching module 540 has a subset of TLB entries which may be associated with the virtual address. The matching module 540 compares the actual page size recorded in the associated TLB entry in the TLB 240 with the supported page size that was used to generate the matching possible TLB index value. If the page sizes are the same (e.g., 64 KB actual page size recorded in the TLB and the supported page size used to generate the possible TLB index value was 64 KB), and the virtual addresses are the same, the match is treated as a cache hit in the TLB 240. If the page sizes are not the same (e.g., 64 KB and 16 MB respectively) or the virtual addresses are not the same, then the TLB entry is not associated with the virtual address. If none of the TLB entries in the subset are associated with the virtual address, then the result is a cache miss.

The retrieval module 550 retrieves the real address that the TLB entry associates with the virtual address if the matching module 540 determines that the TLB entry is associated with the virtual address. As noted above, this may result in the real address being retrieved without reading the PT 250.

If there is no TLB entry associated with the virtual address, the PT 250 is read in order to get the real address. The insertion module 560, in response to the cache miss on the TLB 240, retrieves the actual page size of the page associated with the virtual address from the PTE of the PT 250 and generates the actual TLB index value for the virtual address using the actual page size retrieved from the PTE and the virtual address. The insertion module 560 then inserts the PTE into the TLB 240 as a TLB entry and associates the TLB entry with the actual TLB index value. For example, the insertion module 560 may insert the TLB entry in the position in the TLB 240 associated with the actual TLB index value. The insertion module 560 may also generate an ERAT index value for the ERAT 220 using the actual page size.

Figure 6:
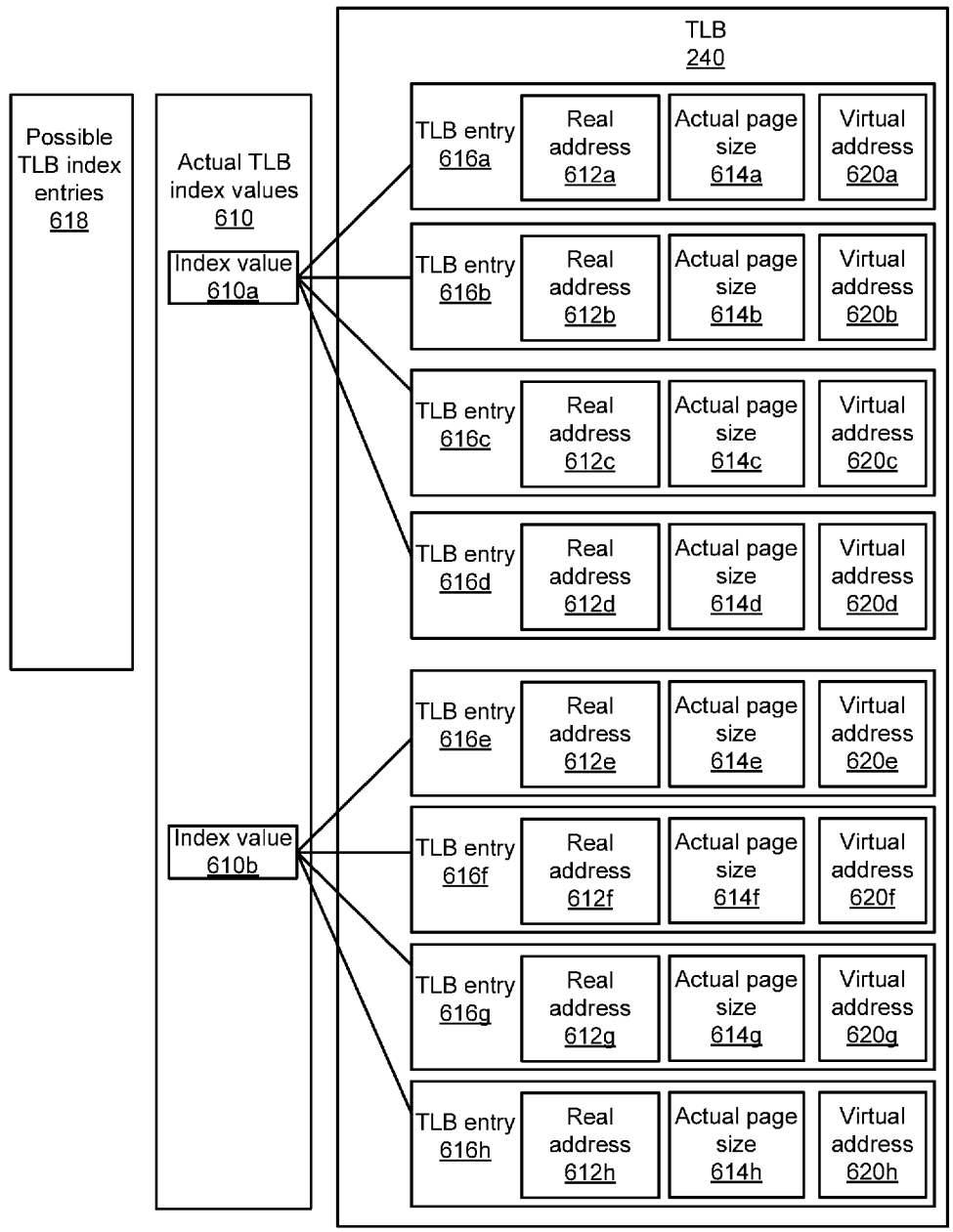
FIG. 6 is a schematic block diagram illustrating one embodiment of a TLB for improved support of MPS segments in a microprocessor.

FIG. 6 shows one block diagram illustrating a possible TLB 240. FIG. 6 shows the TLB 240, including actual TLB index values 610*a* and 610*b*, and TLB entries 616*a-h* which include real addresses 612*a-h*, actual page sizes 614*a-h*, and virtual addresses 620*a-h*. The TLB 240 may contain more information than that shown in FIG. 6. The actual TLB index values 610 may, of course, include far more than two actual TLB index values 610*a-b*, and the present invention is not limited to any particular number of actual TLB index values 610*a-b*. Similarly, the TLB entries 616*a-h* may include more than just the real address 612*a-h* and the actual page size 614*a-h* as shown. FIG. 6 also shows the possible TLB index values 618 that may be generated by the generation module 530.

In one embodiment, the TLB 240 includes the actual TLB index values 610*a* and 610*b*, which act as keys and thus allow retrieval of information from the TLB 240. In certain embodiments, each actual TLB index values 610*a* and 610*b* is associated with one or more TLB entries 616*a-h* (and the associated real addresses 612*a-h* and actual page sizes 614*a-h*). By providing the actual TLB index values 610, a module may retrieve the corresponding TLB entries 616*a-h*. In certain embodiments, the actual TLB index values 610*a-b* are generated using a virtual address and a page size. As shown in FIG. 6, and as described above, more than one TLB entry 616*a-h* may be associated with an actual TLB index value 610*a-b*. The TLB 240 may thus be used to retrieve the real addresses (and page sizes) associated with a virtual address.

In certain embodiments, the generation module 530 generates one or more possible TLB index values 618 using the supported actual page sizes for the MPS segment associated with the virtual address and the virtual address. A particular virtual address may have a number of possible actual TLB index values 610 depending on what page size is used. In the example given above, one possible TLB index value 618 is generated for each of the supported actual page sizes. Thus, there is a possible TLB index value 618 for the 4 KB case; one for the 64 KB case; one for the 16 MB case; and one for the 16 GB case.

In certain embodiments, the matching module 540 searches the actual TLB index values 610 for one of the possible TLB index values 618 in order to find one or more actual TLB index values 610 that match the possible TLB index values 618. The matching module 540 may search sequentially, or in parallel. For example, the possible TLB index value 618 generated assuming a 64 KB page may match index value 610a.

In certain embodiments, once matching actual TLB index values 610a-b are found, the matching module 540 determines which of the TLB entries associated with the actual TLB index values 610a-b is associated with the virtual address by comparing the actual page size 614a-h and the virtual address 620a-h as stored in the TLB entries 616a-h with the supported page size and the virtual address used to generate the possible TLB index value 618. For example, the matching module 540 may compare the actual page sizes 614a-d and the virtual addresses 620a-d of the TLB entries 616a-d to determine which of the four TLB entries 616a-d (if any) is associated with the requested virtual address. The retrieval module 550 may retrieve the real address 612a-h once the matching module 540 verifies that there is a match.

Figure 7:
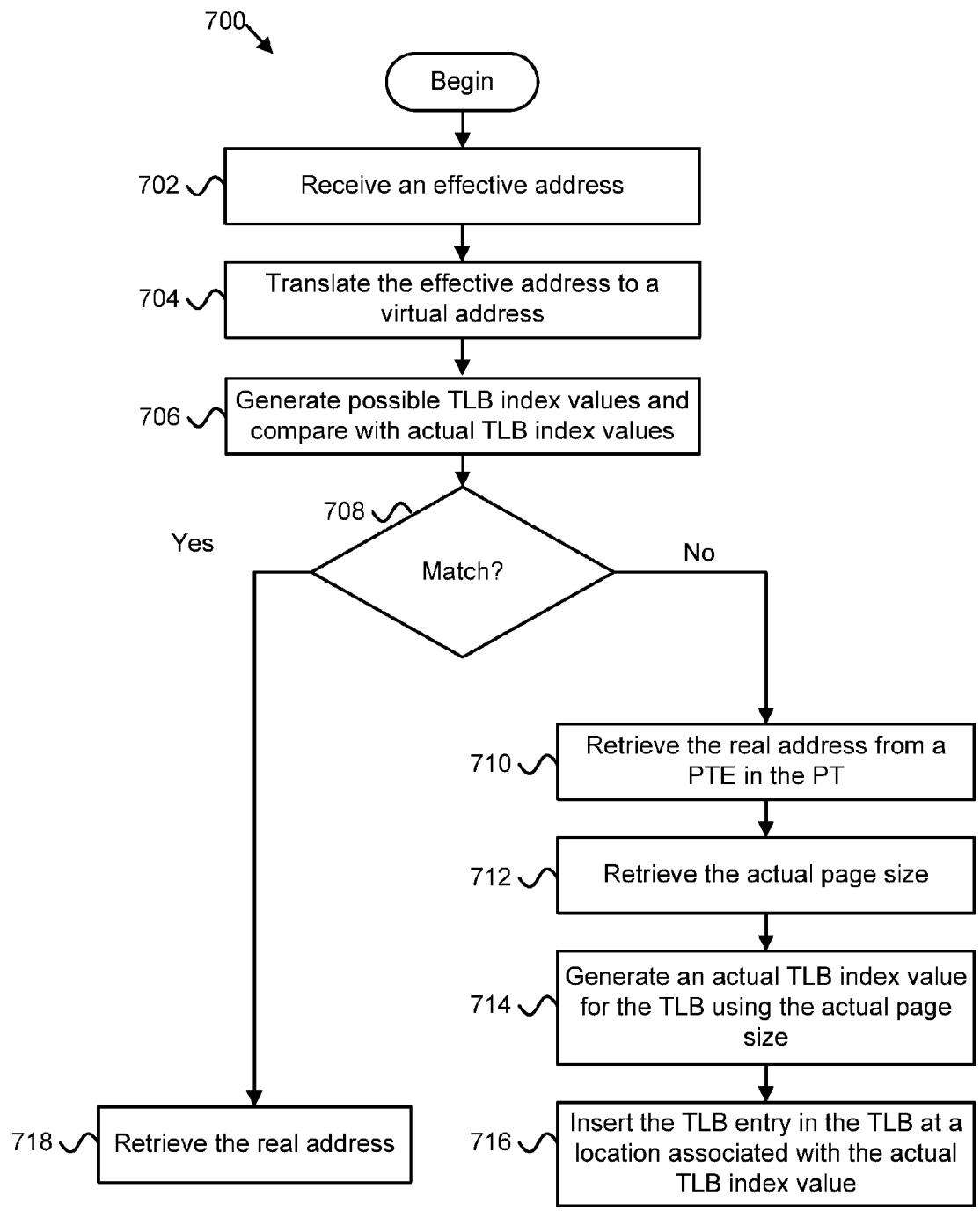
FIG. 7 is a schematic flow chart diagram illustrating one embodiment of a method for improved support of MPS segments in a microprocessor.

FIG. 7 shows one embodiment of a method 700 for improved support of MPS segments in a microprocessor. In one embodiment, the method 700 begins with receiving 702 an effective address. The method may also include translating 704 the effective address into a virtual address using the SLB 230, and receiving the virtual address after it has been retrieved from the SLB 230. The method 700 may also include generating possible TLB index values using the supported actual page sizes for the MPS segment and the virtual address. As described above, this may involve generating one possible TLB index value for each supported actual page size. The possible TLB index values may be hash values generated using the virtual address and a supported actual page size.

The method 700 may also include determining 708 which of the possible TLB index values match the actual TLB index values. The matching step 708 may also include determining, from among the subset of TLB entries that are associated with the actual TLB index values, which TLB entry is associated with the virtual address. Determining whether a TLB entry is associated with the virtual address may include comparing the actual page size in the TLB entry with the supported page size used to generate the possible TLB index value, and the virtual address used to generate the possible TLB index value with the virtual address in the TLB entry. In certain embodiments, these values must match. In certain embodiments, searches of the TLB index for the possible TLB index values are executed in parallel, as is determining which (if any) TLB entries are associated with the virtual address. In other embodiments, the searches are performed serially. If a match is found, the real address is retrieved 718.

If no match is found, in certain embodiments, the method 700 includes retrieving 710 the real address from a PTE in the PT. This may require reading the PT. The method 700 may additionally include retrieving 712 the actual page size from the PTE and generating 714 an actual TLB index value using the actual page size and the virtual address. The method 700 may further include inserting the TLB entry at a location associated with the actual TLB index value. The method 700 may also include generating an index value for the ERAT.

FIG. 8 illustrates one example of how an improved approach for supporting MPS segments in a TLB may be used. FIG. 8 is used as an example, and the particulars of the example are not intended to limit the scope of the claimed invention to the embodiment shown. In FIG. 8, a virtual address 0x1234567 is received. The 4K virtual page number (VPN) portion of the virtual address is 0x1234, and the 64K VPN portion of the virtual address is 0x123.

The generation module 530 may generate two possible TLB index values: the possible TLB index value 1 is 9, and the possible TLB index value 2 is 125. The matching module 540 may then find the corresponding actual TLB index values (shown on the left-hand side) and check the TLB entries associated with these actual TLB index values for a match. As noted above, in certain embodiments, the matching module 540 compares the virtual address and page size used to generate the possible TLB index value with the virtual address and page size stored in the TLB entries to determine whether there is a match. In certain embodiments, the matching module 540 may compare only portions of the virtual address, rather than the entire virtual address. For example, the matching module 540 may compare only the VPN portions of the virtual addresses.

To continue the example of FIG. 8, the matching module 540 may compare the 4K VPN 0x1234 with the VPNs of the TLB entries associated with actual TLB index value number 9. The matching module 540 would not find a match in this case. The matching module 540 may also compare the 64K VPN 0x123 with the VPNS of the TLB entries associated with actual TLB index value number 125. In this case, the TLB entry shown in the third column has a matching VPN. The matching module 540 may further compare the page size used to generate the possible TLB index value 2 (which was 64K) with the actual page size (PS in FIG. 8) and also determine that these two values match. The matching module 540 having confirmed that this particular TLB entry is a match, the retrieval module 550 may retrieve then the real address from this TLB entry.

Embodiments of the present invention may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes," "has," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for improved support of multiple page size ("MPS") segments in a microprocessor, the method comprising:
receiving a first virtual address associated with a page of an MPS segment that supports a plurality of actual page sizes;
generating a plurality of possible index values using the first virtual address and the supported plurality of actual page sizes;
determining whether one or more of the plurality of possible index values correlate to one or more actual translation lookaside buffer (TLB) entries;
in response to determining that one or more of the plurality of possible index values correlate to one or more of the actual TLB entries:
identifying one of the correlated actual TLB entries that includes a first actual page size matching one of the supported actual page sizes, and also includes a second virtual address matching the first virtual address; and
retrieving a real address from the identified actual TLB entry; and
in response to determining that none of the plurality of possible index values correlate to one or more of the actual TLB entries:
retrieving, from a page table entry, a second actual page size of the page associated with the first virtual address; and
generating a new TLB entry and including the second actual page size in the new TLB entry.

2. The method of claim 1, further comprising retrieving the real address that a page table entry ("PTE") in a page table ("PT") associates with the first virtual address in response to determining that none of the correlated actual TLB entries include a matching virtual address.

3. The method of claim 2, further comprising, in response to determining that none of the correlated actual TLB entries include the second virtual address that matches the first virtual address:
determining an actual TLB index value of the first virtual address using the retrieved second actual page size; and
inserting the new TLB entry in the TLB and associating the actual TLB index value with the new TLB entry.

4. The method of claim 2, further comprising generating an effective to real address translation ("ERAT") index value using the retrieved second actual page size and inserting an ERAT entry into an ERAT lookaside buffer and associating the ERAT entry with the ERAT index value.

5. The method of claim 1, wherein generating a plurality of possible index values comprises generating only one possible index value for each of the supported plurality of actual page sizes.

6. The method of claim 1, wherein each possible index value is a hash value generated using the first virtual address and one of the supported plurality of actual page sizes.

7. The method of claim 1, wherein the determining further comprises executing a first search associated with a first possible index value in parallel with a second search associated with a second possible index value.

8. A data processing apparatus for improved support of multiple page size ("MPS") segments in a microprocessor, the apparatus comprising:
a virtual address module for receiving a first virtual address associated with a page of an MPS segment that supports a plurality of actual page sizes;
a generation module for generating a plurality of possible index values using the first virtual address and the supported plurality of actual page sizes;
a matching module for:
determining whether one or more of the plurality of possible index values correlate to one or more actual translation lookaside buffer (TLB) entries; and
in response to determining that one or more of the plurality of possible index values correlate to one or more of the actual TLB entries, identifying one of the correlated actual TLB entries that includes a first actual page size matching one of the supported actual page sizes, and also includes a second virtual address matching the first virtual address;
a retrieval module for:
retrieving a real address from the identified actual TLB entry in response to determining that one or more of the plurality of possible index values correlate to one or more of the actual TLB entries; and
retrieving, from a page table entry, a second actual page size of the page associated with the first virtual address in response to determining that none of the plurality of possible index values correlate to one or more of the actual TLB entries: and
a generation module for generating a new TLB entry and including the second actual page size in the new TLB entry address in response to determining that none of the plurality of possible index values correlate to one or more of the actual TLB entries.

9. The apparatus of claim 8, further comprising an insertion module for, in response to determining that none of the correlated actual TLB entries include a matching virtual address:
determining an actual TLB index value of the first virtual address using the retrieved second actual page size; and
inserting the new TLB entry in the TLB and associating the actual TLB index value with the new TLB entry.

10. The apparatus of claim 8, wherein the generation module generating a plurality of possible index values comprises generating only one possible index value for each of the supported plurality of actual page sizes.

11. The apparatus of claim 8, wherein each possible index value is a hash value generated using the first virtual address and one of the supported plurality of actual page sizes.

12. The apparatus of claim 8, wherein the apparatus is part of a memory management unit ("MMU") of the microprocessor.

13. A system for improved support of multiple page size ("MPS") segments in a microprocessor, the system comprising:
a microprocessor for executing instructions;
a memory management unit (MMU) for handling accesses to memory requested by the microprocessor, the MMU configured to:
receive an effective address and translate the effective address into a first virtual address using a segment lookaside buffer ("SLB"), wherein the first virtual address is associated with a page of an MPS segment that supports a plurality of actual page sizes;
generate a plurality of possible index values using the first virtual address and the supported plurality of actual page sizes;
determine whether one or more of the plurality of possible index values correlate to one or more actual translation lookaside buffer (TLB) entries;
in response to determining that one or more of the plurality of possible index values correlate to one or more of the actual TLB entries:
identify one of the correlated actual TLB entries that includes a first actual page size matching one of the supported actual page sizes, and also includes a second virtual address matching the first virtual address; and
retrieve a real address from the identified actual TLB entry; and
in response to determining that none of the plurality of possible index values correlate to one or more of the actual TLB entries:
retrieve, from a page table entry, a second actual page size of the page associated with the first virtual address; and
generate a new TLB entry and including the second actual page size in the new TLB entry.

14. The system of claim 13, wherein the MMU is further configured to, in response to determining that none of the correlated actual TLB entries include a matching virtual address;
determine an actual TLB index value of the first virtual address using the retrieved second actual page size; and
insert the new TLB entry in the TLB and associating the actual TLB index value with the new TLB entry.

15. The system of claim 13, wherein generating a plurality of possible index values comprises generating one possible index value for each of the supported plurality of actual page sizes.

16. The system of claim 13, wherein each possible index value is a hash value generated using the virtual address and one of the supported plurality of actual page sizes.

17. The system of claim 13, further comprising a motherboard.

18. The system of claim 17, wherein microprocessor, MMU, and the motherboard are part of a computer that is one of a laptop computer, a desktop computer, and a server.

* * * * *